US011657299B1

(12) United States Patent
Yalov et al.

(10) Patent No.: US 11,657,299 B1
(45) Date of Patent: *May 23, 2023

(54) SYSTEM AND METHOD FOR DEVICE IDENTIFICATION AND UNIQUENESS

(71) Applicant: The 41st Parameter, Inc., Scottsdale, AZ (US)

(72) Inventors: Raz Yalov, Scottsdale, AZ (US); Ernest Mugambi, San Jose, CA (US)

(73) Assignee: The 41st Parameter, Inc., Scottsdale, AZ (US)

(*) Notice: Subject to any disclaimer, the term of this patent is extended or adjusted under 35 U.S.C. 154(b) by 85 days.

This patent is subject to a terminal disclaimer.

(21) Appl. No.: 17/089,577

(22) Filed: Nov. 4, 2020

Related U.S. Application Data

(63) Continuation of application No. 14/470,812, filed on Aug. 27, 2014, now Pat. No. 10,902,327.

(60) Provisional application No. 61/872,287, filed on Aug. 30, 2013.

(51) Int. Cl.
*G06N 20/00* (2019.01)
*G06N 5/025* (2023.01)

(52) U.S. Cl.
CPC ............. *G06N 5/025* (2013.01); *G06N 20/00* (2019.01)

(58) Field of Classification Search
CPC ................................ G06N 5/25; G06N 20/00
USPC ........................................................ 706/47
See application file for complete search history.

(56) References Cited

U.S. PATENT DOCUMENTS

| 4,801,924 A | 1/1989 | Burgmann et al. |
| 4,805,222 A | 2/1989 | Young et al. |
| 4,912,761 A | 3/1990 | Tan et al. |
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,583,380 A | 12/1996 | Larsen et al. |

(Continued)

FOREIGN PATENT DOCUMENTS

| AU | 2022206815 | 8/2022 |
| EP | 0 418 144 | 3/1991 |

(Continued)

OTHER PUBLICATIONS

Shabtai et al., "'Andromaly': a behavioral malware detection framework for android devices', J. Intell Inf Syst (2012) 38:161-190 (Year: 2012).*

(Continued)

*Primary Examiner* — Tsu-Chang Lee
(74) *Attorney, Agent, or Firm* — Knobbe, Martens, Olson & Bear, LLP

(57) ABSTRACT

Systems and methods for determining uniqueness of device identifiers are provided. The uniqueness of a device identifier may be indicated by a device quality score or grade that is calculated based on a plurality of parameters associated with a device identifier as well as evaluation rules derived based on historical data. The plurality of parameters may be associated with a network event or transaction associated with the device identifier. The evaluation rules may be derived using machine learning techniques. Based on uniqueness of a device identifier, a suitable action or measure may be taken.

20 Claims, 9 Drawing Sheets

(56) References Cited

U.S. PATENT DOCUMENTS

| | | |
|---|---|---|
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosenberg et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dodder et al. |
| 6,327,384 B1 | 12/2001 | Hirao et al. |
| 6,330,546 B1 | 12/2001 | Gopinathan et al. |
| 6,370,648 B1 | 4/2002 | Diep |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,103,668 B1 | 9/2006 | Corley et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,206,938 B2 | 4/2007 | Bender et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |
| 7,349,955 B1 | 3/2008 | Korb et al. |
| 7,359,962 B2 | 4/2008 | Willebeek-LeMair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,386,892 B2 | 6/2008 | Gilfix et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,630,924 B1 | 12/2009 | Collins et al. |
| 7,631,808 B2 | 12/2009 | Kundu et al. |
| 7,657,626 B1 | 2/2010 | Zwicky |
| 7,660,902 B2 | 2/2010 | Graham et al. |
| 7,665,140 B2 | 2/2010 | Oliver et al. |

(56) References Cited

U.S. PATENT DOCUMENTS

| | | | |
|---|---|---|---|
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,769,032 B1 | 8/2010 | Ou |
| 7,778,846 B2 | 8/2010 | Suresh et al. |
| 7,788,195 B1 | 8/2010 | Subramanian et al. |
| 7,813,937 B1 | 10/2010 | Pathria et al. |
| 7,813,944 B1 | 10/2010 | Luk et al. |
| 7,814,029 B1 | 10/2010 | Siegel |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,490 B1 | 7/2011 | Minter |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,308 B1 | 7/2012 | Gavrylyako et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 * | 10/2012 | Miltonberger ....... G06Q 50/265 706/45 |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,134 B2 | 5/2013 | Wang et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,620,942 B1 | 12/2013 | Hoffman et al. |
| 8,631,006 B1 | 1/2014 | Haveliwala et al. |
| 8,660,539 B2 | 2/2014 | Khambete et al. |
| 8,661,119 B1 | 2/2014 | Jindal et al. |
| 8,676,684 B2 | 3/2014 | Newman et al. |
| 8,677,398 B2 | 3/2014 | Shkedi |
| 8,683,561 B2 | 3/2014 | Utin |
| 8,688,543 B2 | 4/2014 | Dominguez |
| 8,701,168 B2 | 4/2014 | Sastry et al. |
| 8,701,170 B1 | 4/2014 | Barber |

(56) References Cited

U.S. PATENT DOCUMENTS

| | | |
|---|---|---|
| 8,725,570 B2 | 5/2014 | Doughty et al. |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,874,735 B2 | 10/2014 | Barber |
| 8,880,097 B1 | 11/2014 | Xu et al. |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,037,483 B1 | 5/2015 | Curcio et al. |
| 9,038,153 B2 | 5/2015 | Barber |
| 9,060,012 B2 | 6/2015 | Eisen |
| 9,075,896 B2 | 7/2015 | Barber |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,172,691 B2 | 10/2015 | Barber |
| 9,177,293 B1 | 11/2015 | Gagnon et al. |
| 9,183,567 B2 | 11/2015 | Barber |
| 9,191,370 B2 | 11/2015 | Barber et al. |
| 9,196,004 B2 | 11/2015 | Eisen |
| 9,202,039 B2 | 12/2015 | Dandu et al. |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,477,968 B2 | 10/2016 | Barber |
| 9,514,248 B1 | 12/2016 | Guan et al. |
| 9,514,446 B1 | 12/2016 | Rajkumar et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,603,016 B1 | 3/2017 | Mills et al. |
| 9,633,201 B1 | 4/2017 | Katz |
| 9,699,164 B2 | 7/2017 | Barber |
| 9,702,961 B2 | 7/2017 | Shields |
| 9,703,983 B2 | 7/2017 | Eisen et al. |
| 9,712,497 B2 | 7/2017 | Barber et al. |
| 9,722,968 B2 | 8/2017 | Barber |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,916,393 B2 | 3/2018 | Barber |
| 9,948,629 B2 | 4/2018 | Eisen |
| 9,990,631 B2 | 6/2018 | Eisen |
| 10,021,099 B2 | 7/2018 | Eisen et al. |
| 10,037,529 B2 | 7/2018 | Barber |
| 10,089,679 B2 | 10/2018 | Eisen |
| 10,091,312 B1 | 10/2018 | Khanwalkar et al. |
| 10,123,368 B2 | 11/2018 | Gundavelli et al. |
| 10,231,120 B2 | 3/2019 | Nethi et al. |
| 10,248,968 B2 | 4/2019 | Sivaramakrishnan et al. |
| 10,290,017 B2 | 5/2019 | Traasdahl et al. |
| 10,305,880 B2 | 5/2019 | Barber |
| 10,321,309 B2 | 6/2019 | Lee et al. |
| 10,339,306 B1 | 7/2019 | Katz |
| 10,341,344 B2 | 7/2019 | Eisen et al. |
| 10,395,252 B2 | 8/2019 | Eisen |
| 10,402,854 B2 | 9/2019 | Barber |
| 10,417,637 B2 | 9/2019 | Eisen |
| 10,425,379 B2 | 9/2019 | Barber |
| 10,453,066 B2 | 10/2019 | Eisen |
| 10,510,094 B2 | 12/2019 | Sivaramakrishnan et al. |
| 10,535,093 B2 | 1/2020 | Eisen |
| 10,616,201 B2 | 4/2020 | Eisen |
| 10,642,899 B2 | 5/2020 | Barber |
| 10,679,216 B2 | 6/2020 | Barber |
| 10,691,751 B2 | 6/2020 | Atlas et al. |
| 10,726,151 B2 | 7/2020 | Eisen et al. |
| 10,728,350 B1 | 7/2020 | Khanwalkar et al. |
| 10,754,913 B2 | 8/2020 | Liodden et al. |
| 10,853,813 B2 | 12/2020 | Eisen |
| 10,862,889 B2 | 12/2020 | Eisen et al. |
| 10,902,327 B1 | 1/2021 | Yalov et al. |
| 10,956,732 B2 | 3/2021 | Henaff |
| 10,984,128 B1 | 4/2021 | Hoffer |
| 10,999,298 B2 | 5/2021 | Eisen |
| 11,010,468 B1 | 5/2021 | Katz |
| 11,095,643 B2 | 8/2021 | Huffman et al. |
| 11,176,200 B2 | 11/2021 | Barber |
| 11,176,573 B2 | 11/2021 | Barber |
| 11,177,967 B2 | 11/2021 | Pala |
| 11,195,225 B2 | 12/2021 | Eisen |
| 11,223,621 B2 | 1/2022 | Cano et al. |
| 11,238,456 B2 | 2/2022 | Eisen |
| 11,240,326 B1 | 2/2022 | Khanwalkar et al. |
| 11,301,585 B2 | 4/2022 | Eisen et al. |
| 11,301,860 B2 | 4/2022 | Eisen |
| 11,314,838 B2 | 4/2022 | Liodden et al. |
| 11,410,179 B2 | 8/2022 | Eisen |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0140283 A1 | 7/2003 | Nishio |
| 2003/0154214 A1 | 8/2003 | Tu et al. |
| 2003/0158751 A1 | 8/2003 | Suresh et al. |
| 2003/0163359 A1 | 8/2003 | Kanesaka |

(56) References Cited

U.S. PATENT DOCUMENTS

| | | |
|---|---|---|
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2003/0237000 A1 | 12/2003 | Denton et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0021360 A1 | 1/2005 | Miller et al. |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1 | 4/2005 | Chari et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0165643 A1 | 7/2005 | Wilson et al. |
| 2005/0185225 A1 | 8/2005 | Brawn et al. |
| 2005/0187883 A1 | 8/2005 | Bishop et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0246551 A1 | 11/2005 | Dondl et al. |
| 2005/0278542 A1* | 12/2005 | Pierson ............... H04L 63/0876 713/182 |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2007/0011078 A1 | 1/2007 | Jain et al. |
| 2007/0026942 A1 | 2/2007 | Kinsley et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0208619 A1 | 9/2007 | Branam et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0233759 A1 | 10/2007 | Tomlinson et al. |
| 2007/0234070 A1 | 10/2007 | Horning et al. |
| 2007/0239604 A1 | 10/2007 | O'Connell et al. |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1 | 12/2007 | Cucos et al. |
| 2008/0002725 A1 | 1/2008 | Alicherry et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0043634 A1 | 2/2008 | Wang et al. |
| 2008/0045201 A1 | 2/2008 | Kies |
| 2008/0046562 A1 | 2/2008 | Butler |
| 2008/0049779 A1 | 2/2008 | Hopmann et al. |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0109307 A1 | 5/2008 | Ullah |
| 2008/0120195 A1 | 5/2008 | Shakkarwar |
| 2008/0120214 A1 | 5/2008 | Steele et al. |
| 2008/0121690 A1 | 5/2008 | Carani et al. |
| 2008/0126180 A1 | 5/2008 | Ullah |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1* | 7/2008 | Walrath ............... H04L 9/32 726/5 |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |

(56) References Cited

U.S. PATENT DOCUMENTS

| | | |
|---|---|---|
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0255944 A1 | 10/2008 | Shah et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0017805 A1 | 1/2009 | Sarukkai et al. |
| 2009/0018940 A1 | 1/2009 | Wang et al. |
| 2009/0024971 A1 | 1/2009 | Willner et al. |
| 2009/0037602 A1 | 2/2009 | Patel et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0055929 A1 | 2/2009 | Lee et al. |
| 2009/0070664 A1 | 3/2009 | Gavin et al. |
| 2009/0089869 A1 | 4/2009 | Varghese |
| 2009/0106413 A1 | 4/2009 | Salo |
| 2009/0138590 A1 | 5/2009 | Lee et al. |
| 2009/0138593 A1 | 5/2009 | Kalavade |
| 2009/0157417 A1 | 6/2009 | Bradley et al. |
| 2009/0164269 A1 | 6/2009 | Gupta et al. |
| 2009/0171760 A1 | 7/2009 | Aarnio et al. |
| 2009/0177692 A1 | 7/2009 | Chagoly et al. |
| 2009/0183010 A1 | 7/2009 | Schnell et al. |
| 2009/0187625 A1 | 7/2009 | Blackstock et al. |
| 2009/0198629 A1 | 8/2009 | De Prisco et al. |
| 2009/0205031 A1 | 8/2009 | Sato et al. |
| 2009/0222308 A1 | 9/2009 | Zoldi et al. |
| 2009/0228340 A1 | 9/2009 | Bohannon |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0254430 A1 | 10/2009 | Cherenson |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2009/0327333 A1 | 12/2009 | Diener et al. |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0036672 A1 | 2/2010 | Li et al. |
| 2010/0057623 A1 | 3/2010 | Kapur et al. |
| 2010/0057843 A1 | 3/2010 | Landsman et al. |
| 2010/0070606 A1 | 3/2010 | Shenfield et al. |
| 2010/0082136 A1 | 4/2010 | Rosenblatt et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0161728 A1 | 6/2010 | Drozt et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228624 A1 | 9/2010 | Morris et al. |
| 2010/0228625 A1 | 9/2010 | Priyadarshan et al. |
| 2010/0228638 A1 | 9/2010 | Mikan et al. |
| 2010/0235220 A1 | 9/2010 | Guha et al. |
| 2010/0257065 A1 | 10/2010 | Gupta et al. |
| 2010/0262467 A1 | 10/2010 | Barnhill, Jr. et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0313009 A1 | 12/2010 | Combet et al. |
| 2010/0321296 A1 | 12/2010 | Gross |
| 2010/0333170 A1 | 12/2010 | Cox et al. |
| 2011/0015497 A1 | 1/2011 | Eggenberger et al. |
| 2011/0022483 A1 | 1/2011 | Hammad |
| 2011/0022517 A1 | 1/2011 | Hammad |
| 2011/0023115 A1 | 1/2011 | Wright |
| 2011/0029339 A1 | 2/2011 | Callahan |
| 2011/0035302 A1 | 2/2011 | Martell et al. |
| 2011/0047072 A1 | 2/2011 | Ciurea |
| 2011/0055627 A1 | 3/2011 | Zawacki et al. |
| 2011/0082768 A1 | 4/2011 | Eisen |
| 2011/0082858 A1 | 4/2011 | Yu et al. |
| 2011/0106610 A1 | 5/2011 | Landis et al. |
| 2011/0112901 A1 | 5/2011 | Fried et al. |
| 2011/0119267 A1 | 5/2011 | Forman et al. |
| 2011/0153426 A1 | 6/2011 | Reddy et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0313847 A1 | 12/2011 | Cao et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0036261 A1 | 2/2012 | Salazar et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0059711 A1 | 3/2012 | Ramer et al. |
| 2012/0078708 A1 | 3/2012 | Taylor et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0096076 A1 | 4/2012 | Chan |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215777 A1 | 8/2012 | Malik et al. |
| 2012/0215896 A1 | 8/2012 | Johannsen |
| 2012/0216282 A1 | 8/2012 | Pappu et al. |
| 2012/0221404 A1 | 8/2012 | Ahmed et al. |

(56) References Cited

U.S. PATENT DOCUMENTS

| | | |
|---|---|---|
| 2012/0221470 A1 | 8/2012 | Lyon |
| 2012/0222111 A1 | 8/2012 | Oliver et al. |
| 2012/0233640 A1 | 9/2012 | Odryna et al. |
| 2012/0233665 A1* | 9/2012 | Ranganathan ......... G06F 21/51 726/4 |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0254320 A1 | 10/2012 | Dove et al. |
| 2012/0271860 A1 | 10/2012 | Graham, Jr. et al. |
| 2012/0278127 A1 | 11/2012 | Kirakosyan et al. |
| 2012/0278321 A1 | 11/2012 | Traub et al. |
| 2012/0295580 A1 | 11/2012 | Corner |
| 2012/0297380 A1 | 11/2012 | Colbert et al. |
| 2012/0299925 A1 | 11/2012 | Najork et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0324027 A1 | 12/2012 | Vaynblat et al. |
| 2012/0324060 A1 | 12/2012 | Afergan et al. |
| 2012/0330787 A1 | 12/2012 | Hanson et al. |
| 2013/0005299 A1 | 1/2013 | Raleigh |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0054433 A1 | 2/2013 | Giard et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0080327 A1 | 3/2013 | Baldrick et al. |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0097706 A1 | 4/2013 | Titonis et al. |
| 2013/0103482 A1 | 4/2013 | Song et al. |
| 2013/0103629 A1 | 4/2013 | Vaiciulis et al. |
| 2013/0110623 A1 | 5/2013 | Kilroy et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0124329 A1 | 5/2013 | Tengler |
| 2013/0124332 A1 | 5/2013 | Doughty et al. |
| 2013/0124333 A1 | 5/2013 | Doughty et al. |
| 2013/0144539 A1 | 6/2013 | Allen et al. |
| 2013/0148525 A1 | 6/2013 | Cuadra Sanchez et al. |
| 2013/0159192 A1 | 6/2013 | Partridge et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0204793 A1 | 8/2013 | Kerridge et al. |
| 2013/0217330 A1 | 8/2013 | Gardenfors et al. |
| 2013/0226692 A1 | 8/2013 | Kouladjie et al. |
| 2013/0226717 A1* | 8/2013 | Ahluwalia ......... G06Q 20/4016 705/16 |
| 2013/0253965 A1 | 9/2013 | Joseph |
| 2013/0290119 A1 | 10/2013 | Howe et al. |
| 2013/0325601 A1 | 12/2013 | Shekhawat et al. |
| 2013/0326007 A1 | 12/2013 | Turner et al. |
| 2013/0339186 A1 | 12/2013 | French |
| 2013/0339848 A1 | 12/2013 | Patil et al. |
| 2014/0019542 A1 | 1/2014 | Rao et al. |
| 2014/0032902 A1 | 1/2014 | Agrawal et al. |
| 2014/0095320 A1 | 4/2014 | Sivaramakrishnan et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0122697 A1 | 5/2014 | Liu et al. |
| 2014/0129322 A1 | 5/2014 | George et al. |
| 2014/0148197 A1 | 5/2014 | Shields |
| 2014/0180802 A1 | 6/2014 | Boal |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0039596 A1 | 2/2015 | Stewart |
| 2015/0046989 A1 | 2/2015 | Oberheide et al. |
| 2015/0088980 A1 | 3/2015 | Lakes et al. |
| 2015/0106198 A1 | 4/2015 | Miller et al. |
| 2015/0106270 A1 | 4/2015 | Burrell et al. |
| 2015/0120717 A1 | 4/2015 | Kim et al. |
| 2015/0127825 A1 | 5/2015 | Johannsen |
| 2015/0142767 A1 | 5/2015 | Wu et al. |
| 2015/0161207 A1 | 6/2015 | Li et al. |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0235258 A1 | 8/2015 | Shah et al. |
| 2015/0235275 A1 | 8/2015 | Shah et al. |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0326517 A1 | 11/2015 | Block et al. |
| 2015/0350856 A1 | 12/2015 | Circosta et al. |
| 2016/0019546 A1 | 1/2016 | Eisen |
| 2016/0021084 A1 | 1/2016 | Eisen |
| 2016/0034954 A1 | 2/2016 | Tollinger et al. |
| 2016/0036782 A1 | 2/2016 | Jeffrey et al. |
| 2016/0125461 A1 | 5/2016 | Sivaramakrishnan et al. |
| 2016/0182657 A1 | 6/2016 | Mukherjee et al. |
| 2016/0203487 A1 | 7/2016 | Eisen |
| 2016/0246581 A1 | 8/2016 | Jimenez et al. |
| 2016/0275545 A1 | 9/2016 | Dasdan et al. |
| 2016/0321701 A1 | 11/2016 | Artman et al. |
| 2016/0328710 A1 | 11/2016 | Britton et al. |
| 2017/0039571 A1 | 2/2017 | Eisen |
| 2017/0053208 A1 | 2/2017 | Krishnamurthy et al. |
| 2017/0364918 A1 | 12/2017 | Malhotra et al. |
| 2018/0089459 A1 | 3/2018 | Eisen et al. |
| 2018/0108029 A1 | 4/2018 | Sinha et al. |
| 2018/0121915 A1 | 5/2018 | Britton et al. |
| 2018/0227299 A1 | 8/2018 | Varon et al. |
| 2018/0262478 A1 | 9/2018 | Eisen |
| 2018/0322500 A1 | 11/2018 | Eisen |
| 2019/0028472 A1 | 1/2019 | Eisen |
| 2019/0066192 A1 | 2/2019 | Eisen |
| 2019/0340642 A1 | 11/2019 | Barber |
| 2019/0356659 A1 | 11/2019 | Eisen et al. |
| 2019/0370859 A1 | 12/2019 | Traasdahl et al. |
| 2020/0005315 A1 | 1/2020 | Eisen |
| 2020/0013064 A1 | 1/2020 | Eisen |
| 2020/0034845 A1 | 1/2020 | Eisen |
| 2020/0064444 A1 | 2/2020 | Regani et al. |
| 2020/0092287 A1 | 3/2020 | Cano et al. |
| 2020/0218763 A1 | 7/2020 | Barber |
| 2020/0219173 A1 | 7/2020 | Eisen |
| 2020/0294086 A1 | 9/2020 | Traasdahl et al. |
| 2021/0224811 A1 | 7/2021 | Eisen |
| 2021/0226950 A1 | 7/2021 | Eisen |
| 2021/0281580 A1 | 9/2021 | Eisen |
| 2021/0336955 A1 | 10/2021 | Huffman et al. |
| 2022/0043881 A1 | 2/2022 | Putnam et al. |
| 2022/0129969 A1 | 4/2022 | Eisen |
| 2022/0269818 A1 | 8/2022 | Eisen |
| 2022/0270100 A1 | 8/2022 | Eisen |

FOREIGN PATENT DOCUMENTS

| | | |
|---|---|---|
| EP | 0 645 692 | 3/1995 |
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |

(56) References Cited

FOREIGN PATENT DOCUMENTS

| | | |
|---|---|---|
| EP | 2 323 091 | 5/2011 |
| EP | 3 583 758 | 4/2021 |
| EP | 3 937 456 | 1/2022 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-099250 | 4/2000 |
| JP | 2000-137755 | 5/2000 |
| JP | 2000-242582 | 9/2000 |
| JP | 2000-276281 | 10/2000 |
| JP | 2002-007697 | 1/2002 |
| JP | 2002-297869 | 10/2002 |
| JP | 2002-304568 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-018446 | 1/2007 |
| JP | 2007-041642 | 2/2007 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535062 | 8/2008 |
| JP | 2008-535124 | 8/2008 |
| JP | 2008-242805 | 10/2008 |
| JP | 2008-243008 | 10/2008 |
| JP | 2008-257434 | 10/2008 |
| JP | 2008-269229 | 11/2008 |
| JP | 4202314 | 12/2008 |
| JP | 2009-017298 | 1/2009 |
| JP | 2009-048538 | 3/2009 |
| JP | 2009-512940 | 3/2009 |
| JP | 2009-122880 | 6/2009 |
| JP | 2009-175984 | 8/2009 |
| JP | 2009-271661 | 11/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-146153 | 7/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159264 | 8/2011 |
| JP | 2011-159307 | 8/2011 |
| JP | 2011-524560 | 9/2011 |
| JP | 2011-210263 | 10/2011 |
| JP | 2012-234503 | 11/2012 |
| JP | 5191376 | 5/2013 |
| JP | 5216932 | 6/2013 |
| JP | 2015-503148 | 1/2015 |
| KR | 10-1999-0015738 | 3/1999 |
| KR | 10-0645983 | 11/2006 |
| KR | 10-2008-0044558 | 5/2008 |
| KR | 10-2010-0085888 | 5/2008 |
| KR | 10-2009-0051977 | 9/2009 |
| WO | WO 96/041488 | 12/1996 |
| WO | WO 97/003410 | 1/1997 |
| WO | WO 97/023816 | 7/1997 |
| WO | WO 99/050775 | 10/1999 |
| WO | WO 01/011450 | 2/2001 |
| WO | WO 01/033520 | 5/2001 |
| WO | WO 01/086877 | 11/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 | 9/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2011/081818 | 7/2011 |
| WO | WO 2011/104864 | 9/2011 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/070687 | 5/2013 |
| WO | WO 2013/074750 | 5/2013 |
| WO | WO 2013/142722 | 9/2013 |
| WO | WO 2014/022813 | 2/2014 |
| WO | WO 2014/078569 | 5/2014 |
| WO | WO 2017/040799 | 3/2017 |
| WO | WO 2018/129373 | 7/2018 |
| WO | WO 2018/151822 | 8/2018 |
| WO | WO 2022/104341 | 5/2022 |

OTHER PUBLICATIONS

Bourobou et al., "User Activity Recognition in Smart Homes Using Pattern Clustering Applied to Temporal ANN Algorithm", Sensors, May 21, 2015, vol. 15, pp. 11953-11971.

Elkhodr et al., "A Review of Mobile Location Privacy in the Internet of Things", 2012 Tenth International Conference on ICT and Knowledge Engineering, 2012, pp. 266-272.

Kisel et al., "Utilizing a Personalization-Enabled Access Node in Support of Converged Cross-Domain Scoring and Advertising", Bell Labs Technical Journal, 2010, vol. 15, No. 1, pp. 77-94.

Marshall, Jack, "Device Fingerprinting Could Be Cookie Killer", ClickZ. Mar. 2, 2011, pp. 7. http://www.clickz.com/clickz/news/2030243/device-fingerprinting-cookie-killer.

Quora, [No Author Listed], How does a tracking pixel work? by Quora, 2011.

Official Communication in European Patent Application No. 19189189.4, dated Nov. 19, 2020.

Official Communication in European Patent Application No. 19181057.1, dated Oct. 25, 2021.

Summons to Attend Oral Proceedings received in European Application No. EP08159110, dated Jul. 23, 2020.

Official Communication received in European Patent Application No. 16766741.9, dated Aug. 20, 2019.

Summons to Attend received in European Patent Application No. 16766741.9, dated Mar. 25, 2020.

Official Communication received in European Patent Application No. 21154719.5, dated Jun. 15, 2021.

International Search Report and Written Opinion for Application No. PCT/US2012/065220, dated Mar. 21, 2013.

International Preliminary Report on Patentability in Application No. PCT/US2012/065220, dated May 30, 2014.

International Search Report and Written Opinion for Application No. PCT/US2016/049930, dated Nov. 9, 2016.

U.S. Appl. No. 14/470812, U.S. Pat. No. 10,902,327, System and Method for Device Identification and Uniqueness, Aug. 27, 2014.

Banking Services Newsletter, "Keeping You Up-to-Date on Banking Developments Throughout the UC System", University of California, Office of the President, Banking Services Group, Newsletter 1, Dec. 2005, p. 1.

Bharosa, "Bharosa Authenticator", http://www.bharosa.com/authenticator.html, Jan. 18, 2007, pp. 3.

Bharosa, "Bharosa Announces Online Authentication Solution to Counter Check 21-Based Fraud", http://www.bharosa.com/news/PR-110705.html, Jan. 18, 2007, pp. 2.

(56) References Cited

OTHER PUBLICATIONS

Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Work", Millennium Edition, Que Corporation, Indianapolis, In, Sep. 2000, pp. 230.
Gralla, Preston, "How the Internet Works", Millennium Edition, Que Corporation, Indianapolis, In, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
TechWeb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
Official Communication in European Patent Application No. 19189189.4, dated Jan. 21, 2020.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 19181057.1, dated Sep. 17, 2019.
Official Communication in European Patent Application No. 8159110.9, dated Oct. 27, 2008.
Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 16, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
Provisional Application as filed in U.S. Appl. No. 61/324,312, dated Apr. 15, 2010 in 15 pages.
Eckersley, Peter, "How Unique Is Your Web Browser?", Electronic Frontier Foundation, 2010, pp. 19.
Faulkner, Alisdair, "Fraud Network Whitepaper", ThreatMetrix, Whitepaper, 2010, pp. 16.
Schmücker, Niklas, "Web Tracking", SNET2 Seminar Paper—Summer Term 2011, Berlin University of Technology, pp. 12.

\* cited by examiner

SYSTEM AND METHOD FOR DEVICE IDENTIFICATION AND UNIQUENESS

CROSS-REFERENCE

This application is a continuation application of U.S. application Ser. No. 14/470,812, filed Aug. 27, 2014, which claims the benefit of priority to U.S. Provisional Application No. 61/872,287, filed Aug. 30, 2013, where all above-cited applications are hereby incorporated by reference herein in their entirety.

BACKGROUND OF THE INVENTION

With rapid advancement of computer technologies and e-Commerce, people are increasingly reliant on a variety of internet-connected devices for everything from banking to booking travel to shopping. As a service provider, it has become increasingly important to distinguish among the different devices in order to provide detect and prevent online fraud and/or to provide customized content or services.

SUMMARY OF THE INVENTION

System and methods for determining uniqueness of device identifiers are provided. According to an aspect of the invention, a computer-implemented method for determining uniqueness of a device identifier is provided. The method comprises obtaining a plurality of evaluation rules based at least in part on historical data and determining the uniqueness of the device identifier based at least in part on the evaluation rules and a plurality of parameters associated with the device identifier. Obtaining the one or more evaluation rules may include analyzing the historical data using a machine learning technique. Determining the uniqueness of the device identifier may include determining a device quality score associated with the device identifier. Determining the uniqueness of the device identifier may include selecting a subset of the one or more evaluation rules based at least in part on the plurality of parameters and applying the subset of evaluation rules to at least some of the plurality of parameters to obtain the device quality score. The method may further comprise determining a suitable action based at least in part on the uniqueness of the device identifier. Determining the suitable action may include selecting a first action if the device identifier is more likely to be unique and selecting a second action if the device identifier is less likely to be unique.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
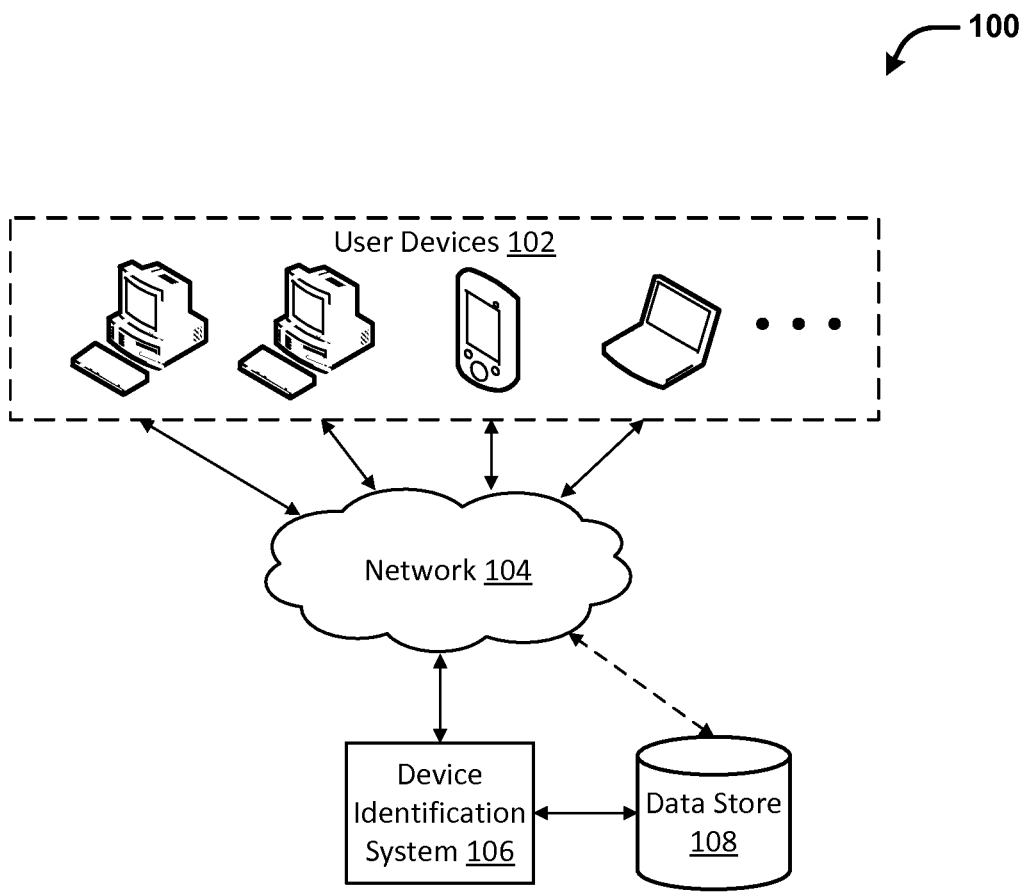
FIG. 1 illustrates an example environment for implementing the present invention, in accordance with an embodiment.

According to aspects of the present invention, a device identification system and methods may be provided for determining the uniqueness of device identifiers. Network devices, such as desktops, laptops, tablet computing devices, smart phones, smart TVs, and the like, may be identified using device identifiers. Such device identifiers may be provided or generated by the manufacturers, distributors, developers, or any suitable entity. Examples of device identifier may include Android identifier (ID), iPhone's Unique Identifier (UDID), iPhone's Identifier for Advertising (IFA or IDFA), cookie ID, login ID, Internet Protocol (IP) address, media access control (MAC) address, a hash of any of the above, a combination of any of the above, or the like. In some cases, the device identifier may be derived based on one or more hardware and/or software parameters of a device identified by the device identifier. For example, a device identifier may be derived from the IP address, operating system version, and locale setting of the device. In some embodiments, a device identifier may be used to identify the source or origin or a transaction, request, or network event. For example, a device identifier may include a user identifier, an account identifier, and the like. Ideally, a device identifier uniquely identifies a device. In other words, different devices are mapped to different device identifiers, for example, based on unique software/hardware characteristics associated with the devices. However, in some cases, different devices may have the same device identifiers. In some cases, such as in an online fraud, such sharing of device identifiers may be intentional. In some other cases, such sharing of device identifiers may be unintentional.

In some embodiments, a device identifier may be used to distinguish among the entities (e.g., users) associated with the devices identified by the device identifier. For example, a content or service provider may use such device identifiers to distinguish among different users so as to provide customized advertisement or service items tailored to the preferences of the users. However, such targeted user-specific action (e.g., target advertisement delivery) is only effective when there is a high probability that the device identifier is indeed unique, that is, it is very likely that the device identifier is not shared by multiple devices. In some instances, different devices may have the same device identifiers. For example, the Android ID for two Android devices may be the same. For another example, two devices may have the same IP address. As yet another example, devices having similar or different parameters may result in having the same value for their device identifiers. In such cases when the device identifier is not unique, targeted action may not be feasible or desirable. Rather, a different action or approach may be required.

As an example, consider two users Carola and Marley. Carola operates a device 1 to access a shopping website and Marley operates a device 2 to access the same shopping site. Carola is interested in jewelry and art and Marley is interested in cars and technology. The service provider operating the shopping website may be able to deliver different targeted advertisement to Carola and Marley based on their different preferences if the service provider can distinguish the device 1 from device 2. In other words, given a device identifier, if the service provider can be confident that the device identifier is unique, that is, it is unique to a specific device, then the service provider's may be able to provide effective targeted content. On the other hand, if for a given the device identifier, the service provider is not confident that the device identifier is unique (i.e., associated with only with Carola or only with Marley), then it may be undesirable to delivery customized content because it may offend or otherwise alienate the unintended audience of such customized content. Rather, providing more generic content may prove to be more effective in this case.

As another example, a fraud detection engine may be configured to detect fraudulent activities associated of network devices. For a given device identifier associated with fraudulent transactions, if it is likely that the device identifier is unique, it may be desirable to take specific fraud prevention actions with respect to activities associated with the device identifier. For example, the device identifier may be added to a blacklist so that activities associated with the device identifier are blocked. This may be a desirable solution that prevents future fraud without affecting non-rogue devices since it is unlikely that the device identifier is shared by other devices. Conversely, if the device identifier is likely to be non-unique, then put the device identifier into a blacklist may unduly impact legitimate activities of non-rogue devices that happen to share the same device identifier. Rather, a more moderate measure may be taken such as monitoring instead of blocking traffic coming from devices identified by the device identifier.

Figure 2A:
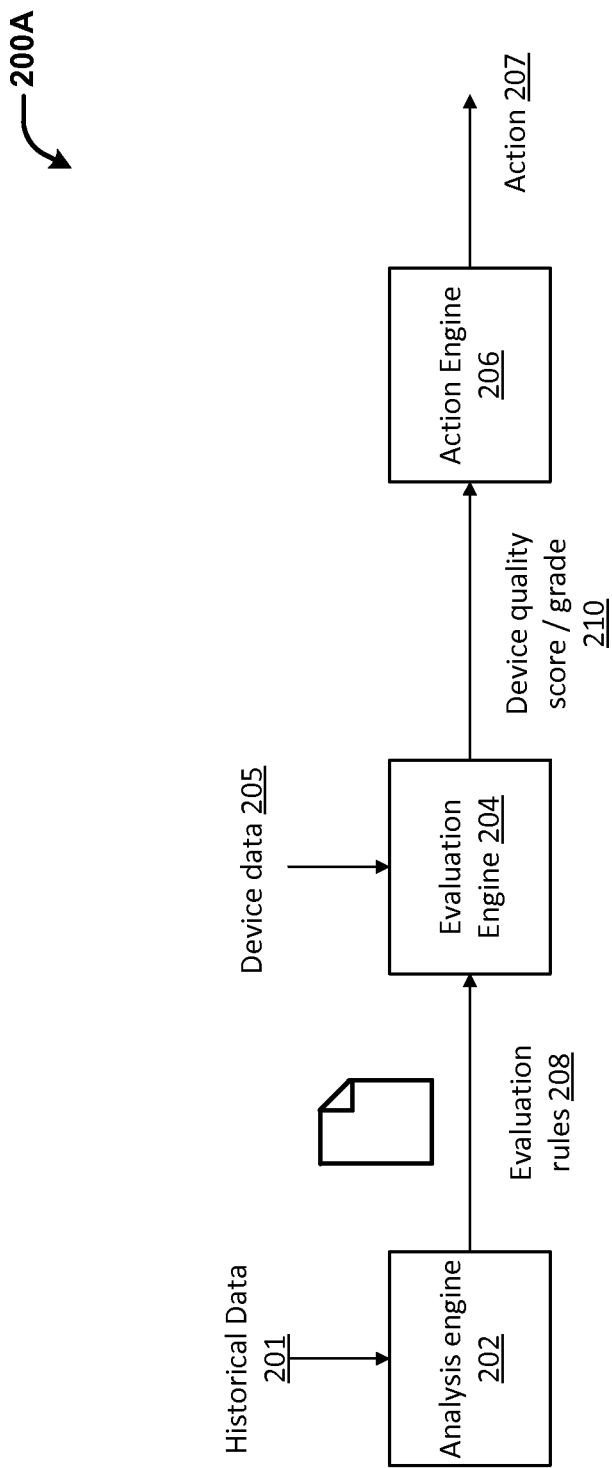
FIG. 2a illustrates example components of a device identification system, in accordance with an embodiment.

According to aspects of the present invention, a device identification system and methods may be provided for determining the uniqueness of device identifiers. The device identification system may include an analysis engine, an evaluation engine, and optionally, an action engine (such as illustrated in FIG. 2a below). The analysis engine may be configured to generate, based on historical data, rules that may be used to determine the uniqueness of device identifiers. Specifically, the rules may be used to derive a quality score associated with a given device identifier. Quality score may be a numerical value. For instances, the quality score may be any integer between 0 and 100 (inclusive) where the higher the quality score the more likely that the device identifier is unique. The rules may be stored in a data store which may include a database or a data file (e.g., a JSON file) that is accessible to the evaluation engine.

The evaluation engine may be configured to receive a plurality of parameters associated with a device identifier, select the applicable rules (e.g., based on at least some of the parameters such as the device's operating system or hardware type) and apply the rules to the plurality of parameters to derive a quality score and/or a quality grade. In some cases, the quality grade may be derived based on the quality score. In some embodiments, the plurality of parameters may include any hardware and/or software parameters associated with a device identified by the device identified.

In some embodiments, the plurality of parameters may include deterministic identifiers such as customer ID, login ID, account ID, cookie ID, UDID, Android ID, IFA or IFDA, Identifier For Vendor (IFV), International Mobile Equipment Identity (IMEI), MAC address, IP address, and the like.

In some embodiments, the plurality of parameters may include client and/or server location and/or geographical information; client device trustability score or similar indicator; user lifetime value (LTV) or similar indicator; client device Return on Investment Index (ROIndex) or similar indicator; device metadata such as manufacturer (e.g., Apple, Samsung, Microsoft, Dell, etc), name (e.g., iPhone), model, version, and the like; device operating system (e.g., iOS, Android, Windows Phone, BlackBerry, Mac OS, OS X, Microsoft Windows, Unix, Linux, BSD, etc.); browser metadata such as maker (e.g., Google, Microsoft, Mozilla), name (e.g., Chrome, Internet Explorer, Firefox, Opera, Safari), version, and the like; other software and/or hardware characteristics (e.g., Adobe Flash version); event type such as impression, click or selection, download, page load, and the like; event type detail such as campaign type, transaction type, and the like; customer type and industry; and other parameters.

In typical embodiments, such parameters are obtained without the awareness of the user operating the device. In some cases, some or all of the parameters may be obtained with the user's awareness. In some embodiments, some or all of the parameters may be included in one or more requests or messages provided by the device or by another entity such as a Domain Name System (DNS) server, an Active Directory (AD) server, and the like. Example parameters may include user agent (UA), IP address, user identity, user credentials, network protocol, service endpoint, Hypertext Transfer Protocol (HTTP) method and/or status code, operating system, locale or language code, processor architecture, device type (e.g., desktop, mobile phone, etc.) and the like. In some embodiments, some or all of the parameters discussed herein may be used to derive the device identifier and to derive the quality score or grade. For example, the parameters may be concatenated, combined, appended, hashed, encrypted, and otherwise processed to derive the device identifier and/or quality score or grade. For example, in an embodiment, the device identifier may include a 40-character SHA-1 hash of some of the parameters.

In some embodiments, a set of applicable rules may be selected based at least in part on some of the parameters associated with the device identifier. For example, different sets of rules or the same set of rules may be provided for different types of devices and/or operating systems. For example, a first set of rules may be selected for an Android device whereas a second set of rules may be selected for an iOS device.

In an embodiment, the rules include, for each of at least some of the plurality of parameters, a corresponding value-weight map. In some cases, the rules may include usage rules associated with the value-weight maps that specify how the maps should be applied to the parameter. In other embodiments, such usage rules may be optional. Each of the value-weight maps may include one or more parameter values or value ranges along with corresponding weights. The parameter values may include any of the above-discussed parameters or a derivation thereof. The table below provides an example value-weight map for the user agent parameter:

| Parameter Value | Weight |
|---|---|
| 8 | 0.5 |
| 10 | 0.38 |
| 12 | 0.01 |
| ... | ... |

For the above example, a usage rule associated with the value-weight map may specify that the parameter value to be used to look up the value-weight map is the length of the user agent identifier character string. For example, given a user agent parameter of "UA_2.8.1", the corresponding parameter value, according to the "UA-length" rule, is 8, the length of the character string "UA_2.8.1" and the corresponding weight is 0.5.

Thus, for at least some of the plurality of parameters associated with the device identifier, corresponding weights may be obtained by applying the rules (e.g., by looking up the corresponding parameter-specific value-weight map as specified by usage rule).

While the value-weight maps illustrated here each corresponds to a specific parameter, in some embodiments, a value-weight map may correspond to more than one parameter. For example, the value used to look up the value-weight map may be derived based on the values of one or more parameters.

In some embodiments, the weights associated with the parameters may be weighted, for example, based on the perceived importance of the parameters. The perceived importance of the parameters may be determined based on statistical analysis of the historical data. For example, in an embodiment, the weight associated with the IP address parameter may be given a larger weight than the weight associated with the user agent parameter.

A quality score indicative of the uniqueness of a device identifier may be derived based on the parameter weights, which may be weighted as discussed above. For example, the device score may be calculated as a linear combination of the weighted weight values. The quality score may be categorized into quality grades. For example, a quality score between 80 and 100 may be categorized as quality grade A, a quality score between 60 and 80 may be categorized as quality grade B, and so on. Thus, device identifiers may be segmented according to their quality grades. In general, a device identifier is considered to be "high quality" if it has a high quality score or grade and "low quality" if it has a low quality score or grade.

In some embodiments, the value-weight maps, usage rules, formula and/or algorithm for calculating the quality scores and the like are collectively referred to as the evaluation rules (or rules). Some or all of such evaluation rules may be derived based on the historical data associated with past user activities and usage of computing resources. In particular, the historical data may be analyzed using statistical analysis and machine learning techniques such as logistical regression. Other suitable data mining techniques may also be used. Such data analysis may be performed by the analysis engine with or without human intervention.

As discussed above, the calculation of the quality scores or grades does not involve analyzing vast amount of historical data. Rather, the calculation is performed based on the rules derived from the historical data. The size of the rules may be significantly smaller than the size of the historical data which the rules are based on. For example, the rules may fit in one or more JSON files whereas the historical data may be stored in large data storage systems. Given the pre-calculated or derived rules, the time and complexity of the quality score/grade calculation (and hence determination of uniqueness of device identifiers) is significantly reduced. In some cases, uniqueness determination may be performed efficiently for a large amount of transactions in a short period of time. As the historical data evolve over time, the rules derived from the historical data may be updated to reflect any changes (e.g., on a periodic basis). By using such updated rules, the quality score/grade calculation also reflects the changes in historical data.

In some embodiments, the device identification system discussed herein may or may not include an action engine. The action engine may be configured to take different actions based on the uniqueness of device identifiers (such as indicated by the quality grades or quality scores). For example, the action engine may be configured to provide more targeted content to devices associated with a high quality device identifier and less targeted content to devices associated with a lower quality device identifier. It shall be understood that different aspects of the invention can be appreciated individually, collectively, or in combination with each other.

FIG. 1 illustrates an example environment 100 for implementing the present invention, in accordance with an embodiment. As illustrated, one or more user devices 102 connect via a network 104 to a device identification system 106 configured to provide device identification functionalities described herein. In various embodiments, the user devices 102 may include any devices capable of communicating with the network 104, such as personal computers, workstations, laptops, smartphones, mobile phones, tablet computing devices, smart TVs, game consoles, internet-connected setup boxes, kitchen appliances and the like. In some embodiments, the user devices 102 may include applications such as web browsers and/or applications (e.g., mobile apps) that are capable of communicating with the device identification system 106 and/or a system that uses the device identification system 106.

In some embodiments, the device identification system 106 may include or be included in one or more computing systems. For example, the device identification system 106 may be a part of a content provider. For example, the device identification system 106 may be a runtime component of a web server of the content server. As another example, the device identification system 106 may be a part of a fraud detection system or service used by an online service provider such as a bank, a merchant, a payment service provider, and the like. In some embodiments, the device identification system may be owned and/or operated by the same or different entity as the content provider.

In some embodiments, the device identification system 106 may be implemented by one or more physical and/or logical computing devices or computer systems that collectively provide the functionalities described herein. For example, aspects of the device identification system 106 may be implemented by a single server or by a plurality of servers (e.g., distributed Hadoop nodes). As another example, aspects of the device identification system 106 may be implemented by one or more processes running on one or more devices. In some embodiments, the device identification system 106 may provide an API such as a web service interface that may be used by users or other processes or services to utilize the functionalities of the device identification system discussed herein.

In some embodiments, the device identification system 106 may comprise one or more computing services provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

In some embodiments, the device identification system 106 may communicate with a data store 108 in order to perform the functionalities described herein. For example, the data store 108 may be used to store historical data, evaluation rules, and the like.

In some embodiments, the data store 108, or any other data stores discussed herein, may include one or more data files, databases (e.g., SQL database), data storage devices (e.g., tape, hard disk, solid-state drive), data storage servers, or the like. In various embodiments, such a data store 108 may be connected to the device identification system 106 locally or remotely via a network. In some embodiments, data store 108, or any other data stores discussed herein, may comprise one or more storage services provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

In various embodiments, the network 104 may include the Internet, a local area network ("LAN"), a wide area network ("WAN"), a cellular network, wireless network or any other public or private data and/or telecommunication network.

FIG. 2a illustrates example components of a device identification system 200A, in accordance with an embodiment. The device identification system 200A may be similar to the device identification system 106 discussed in FIG. 1. In various embodiments, the device identification system 200A may include one or more components that individually or collectively provide a set of functionalities. Each component may be implemented by one or more physical and/or logical computing devices, such as computers, data storage devices and the like. Some or all of the components may be co-located on the same device or distributed on different devices. The components may communicate with each other or with external entities such as other systems, devices or users. It will be appreciated by those of ordinary skill in the art that various embodiments may have fewer or a greater number of components or subcomponents than those illustrated in FIG. 2a. Thus, the depiction of the environment in FIG. 2a or in other figures should be taken as being illustrative in nature and not limiting to the scope of the disclosure.

In the illustrated embodiment, the device identification system 200A includes an analysis engine 202, evaluation engine 204 and an action engine 206. In some other embodiments, the device identification system 200A may include a subset or a superset of the illustrated components. For example, in an embodiment, the device identification system may include only the evaluation engine. In another embodiment, the device identification system may include only the analysis engine and the evaluation engine. In some embodiments, some or all of the components discussed herein may be combined or further divided into subcomponents. Some or all of the components may be implemented by the provider of the system or by a third party service provider.

The analysis engine 202 may be configured to generate, based on historical data 201, evaluation rules or rules 208 that may be used to determine the uniqueness of device identifiers. Specifically, the rules may be used, for example, by the evaluation engine 204, to derive a quality score or grade 210 associated with a given device identifier. Such rules may be derived based on historical data obtained from many user devices and many transactions. Various techniques may be used to derive the rules including machine learning techniques, neural networks, fuzzy logic, statistical analysis (e.g., logistical regression), and the like. Rules may be generated automatically with aid of a processor. Human intervention may or may not be required for generating the rules.

The historical data may include data (including statistics) related to past user activities, transactions, requests, responses, usage of computing resources and the like. In some cases, the historical data may include information indicative of reliability, trustworthiness or uniqueness of user devices. For example, the historical data may indicate that a certain IP address or a certain operating system is susceptible to security problems (e.g., virus, Denial of Service (DoS) attack, session hijacking, Man-in-the-Middle (MITM) or Man-in-the-Browser (MITB) attacks, etc.). As another example, the historical data may indicate that certain types of devices tend to share the same device identifiers.

The evaluation engine 204 may be configured to determine uniqueness of a device identifier based on evaluation rules 208, discussed above. To that end, the evaluation engine 204 may be configured to obtain device data 205 associated with a device. In some embodiments, the device data may include a plurality of parameters associated with or used to derive a device identifier. In some cases, device data may include the device identifier itself. The plurality of parameters may include any hardware and/or software parameters associated with a device identified by the device identified such user agent identifier, IP address, user identity information, user credentials, network protocols, service endpoint, service method, HTTP method and/or status code, operating system, locale or language code, processor architecture, device type (e.g., desktop, mobile phone, etc.) and the like. In some embodiments, the plurality of parameters may be associated with a particular transaction or network event.

Based at least in part on the plurality of parameters (e.g., device type), the evaluation engine 204 may be configured to select and apply some or all of the evaluation rules 208 made available by the analysis engine 202. In some embodiments, the evaluation rules may be stored in a data store or data file that is made available to the evaluation engine 204. The evaluation rules may be applied to at least some of the parameters to derive a device quality score or grade using methods discussed herein.

In some embodiments, the rules may be used to determine quality score and/or quality grade without requiring access to historical data. Such determination may be performed, for example, by the evaluation engine. Such a rules-only approach may be beneficial. For example, in some cases, the historical data may include sensitive or personally identifying information such as credit card information. In such cases, it may be undesirable to allow certain entities to have access to the historical data, for example, for privacy concerns.

The device quality score or grade may be used by the action engine 206 to determine an action 207. In various embodiments, the action engine may include or be included in one or more web servers, data servers, security and/or fraud detection servers and the like. The action may include retrieval, storage, processing, modification, transmission, or the like, of one or more responses to a request, internal or external messages or instructions, content data, and the like. In some cases, device identification system discussed herein may be used to detect fraudulent and/or malicious attacks such as session hijacking, MITM/MITB attacks, harvesting P2P networks, and the like. In some cases, device identification system may be used to determine suitable content (e.g., advertisement) to provide.

In some embodiments, analysis engine, the evaluation engine and the action engine may reside on the same or different computing devices and may each be implemented by one or more computing devices or processes. In some embodiments, the rules, the device quality scores or grades, and/or the actions may be generated in real or nearly real time as the data is coming in, or in an asynchronous fashion such as in using batch processing. In some embodiments, the generation of rules and the evaluation of the uniqueness of device identifiers can be independent from each other. The rules may be generated and/or updated at a different time schedule than that for the evaluation of the device identifiers. For example, in an embodiment, the rules are generated ahead of time and updated on a periodic basis. Independently or asynchronously to the generation and/or update of rules, device identifiers may be evaluated in real or nearly real time using the rules.

In some embodiments, analysis engine, the evaluation engine and the action engine may be configured to provide the various functionalities discussed herein in a synchronous or asynchronous fashion. For example, the generation of rules may be performed offline, in an asynchronous fashion. The evaluation of device quality score or grade may be performed in real time or nearly real time as the device data is received. The determining of a suitable action based on the device score and/or grade may be performed in real time or nearly real time.

Figure 2B:
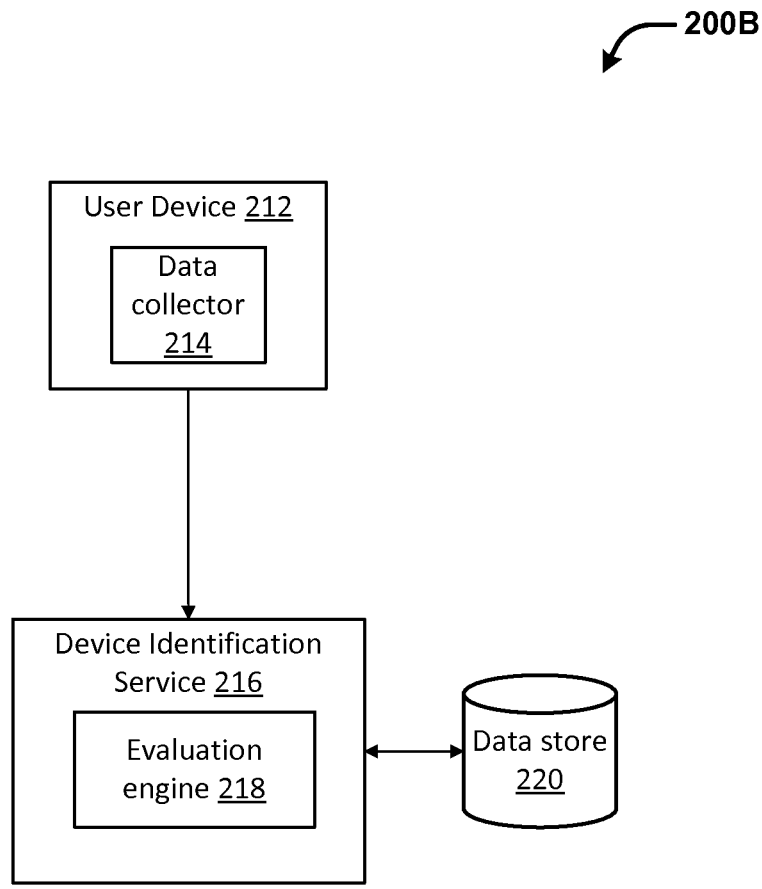
FIG. 2b illustrates example components of a device identification system, in accordance with another embodiment.

FIG. 2b illustrates example components of a device identification system 200B, in accordance with another embodiment. In this example, the device identification system 200B includes a data collector 214 residing on a user or client device 212. The data collector may be implemented as a browser script using JavaScript or any other scripting language. The data collector may be configured to communicate with a device identification service 216. For example, the data collector may be configured to collect parameter information about the user device such as discussed herein and transmit such parameter information to the device identification service 216, for example, using an API provided by the device identification service. In some embodiments, the collection and/or communication with the device identification service may be triggered by an event such as a browser event. For example, the event may include a click on a portion (e.g., a button or a link) of a web page, loading of a web page and the like.

The device identification system 200B includes a device identification service 216 that may be implemented as a web service. The device identification service 216 may be implemented by one or more servers. The servers implementing the device identification service 216 may be owned and/or provided by a content or service provider for the user device (e.g., banking, ecommerce, retail) or by the provider of the device identification system 200B.

In some embodiments, the device identification service 216 may be configured to receive parameter information provided by the data collector of the user device and to provide a device identifier and/or device quality score or grade based on the parameter information. To that end, the device identification service 216 may utilize an evaluation engine 218. The evaluation engine 218 may be configured to calculate a device identifier and/or a device quality score or grade based on the parameter information. In some embodiments, the evaluation engine 218 may be implemented using one or more server-side library files.

In some embodiments, some or all of the parameters may be used to derive the device identifier. For example, the parameters may be concatenated, combined, appended, hashed, encrypted, and otherwise processed. For example, in an embodiment, the device identifier may include a 40-character SHA-1 hash.

In some embodiments, the device quality score or grade may be evaluated based on some or all of the parameters. For example, a lookup table (e.g., stored in memory) may be used to determine the weight values associated with some or all of the parameters. The weight values may or may not be further weighted, combined or otherwise processed to derive a final device quality score or grade. The device quality score may be categorized into a device quality grade. In some embodiments, the lookup table and the algorithm for deriving the quality score or grade may be included on one or more rules that are pre-determined based on historical data such as past transactions and/or user activities related to one or more websites or web services. Thus, access to the actual historical data may not be required for the evaluation of the quality scores or grades. In some embodiments, the generation of the device identifiers and/or the associated device quality scores and/or grades may be performed in real time or nearly real time with respect to the receipt of the parameter information. In other embodiments, any or all of the above operations may be performed in an asynchronous mode, for example, using batch processing.

In some embodiments, the generated device identifier and associated device quality score and/or grade may be stored in a data store 220. The data store 220 may include a user ID map (not shown) or a similar data structure configured to store a mapping between device identifiers and device quality scores and/or grades. In some embodiments, the data store 220 may include a memory of a server, one or more data storage device (e.g., SSD, hard disk, taps), or a cloud-based storage service such as discussed in connection with FIG. 1. The data store 220 may or may not be owned and/or operated by the same as the provider of the device identification service 216. For example, the user ID map may be stored at least in part on a customer server and/or a fraud-detection system.

In some embodiments, the storing of the device identifiers and/or the associated device quality scores and/or grades may be performed in real time or nearly real time as the above information is generated. In other embodiments, any or all of the above operations may be performed in an asynchronous mode, for example, using batch processing.

In various embodiments, the user ID map may be used by any suitable entity for any suitable purpose. For example, in an embodiment, the user ID map may be used by a content provider to determine the type of content to provide to a user device. More targeted content (e.g., advertisement) may be provided for device identifiers with higher quality grades and less targeted content may be provided for device identifiers with lower quality grades. In another embodiment, the user ID map may be used by a fraud detection system to detect and/or prevent online fraud.

In some embodiments, the user ID map may be used to update and/or refine the evaluation rules (e.g., including weight lookup table, device score computation algorithm) discussed herein. For example, the user ID map may be provided for research purposes. The research may be performed by a provider of the device identification system or a third party service provider.

Figure 3:
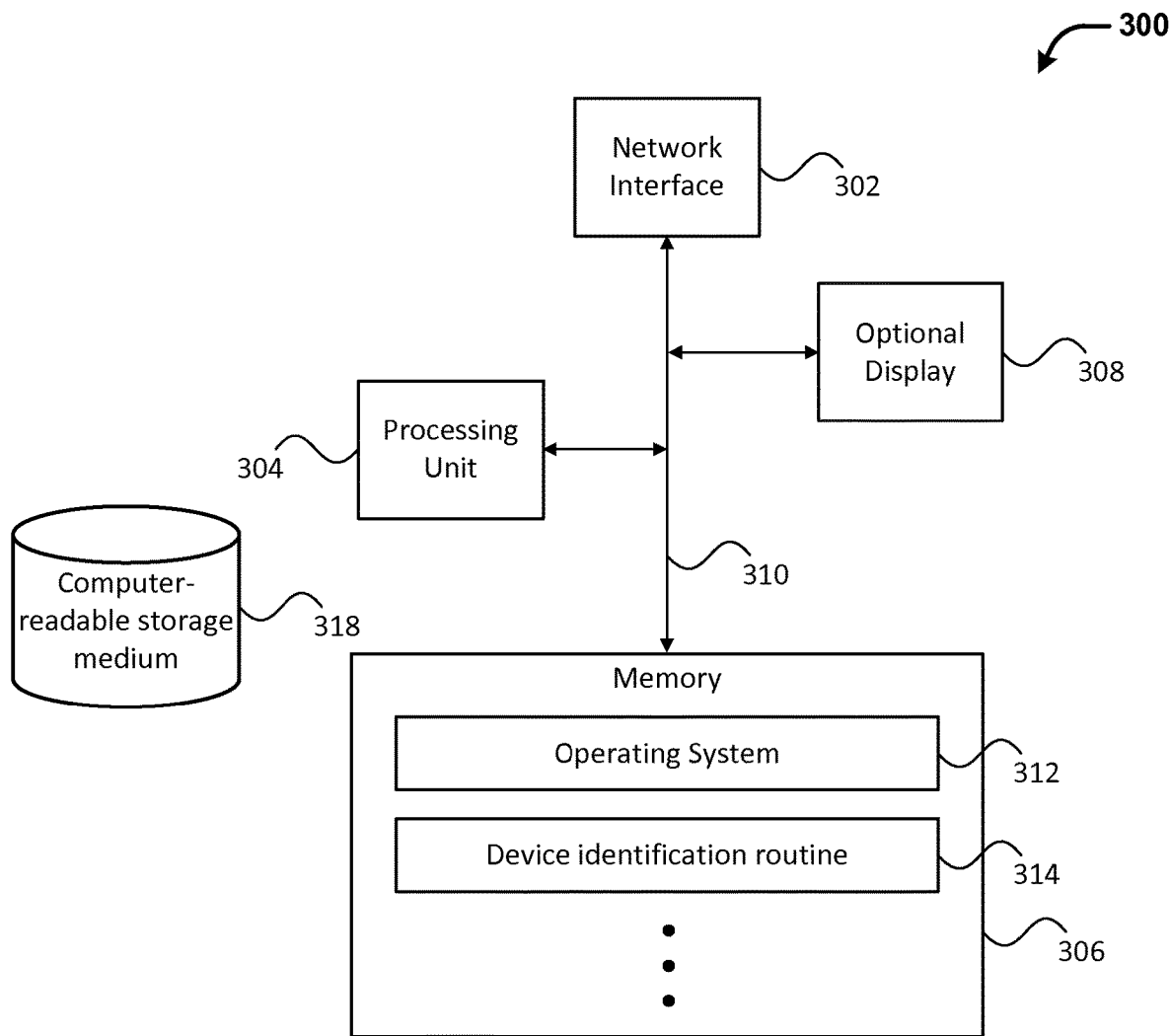
FIG. 3 illustrates example components of a computer device for implementing aspects of the present invention, in accordance with an embodiment.

FIG. 3 illustrates example components of a computer device 300 for implementing aspects of the present invention, in accordance with an embodiment. In another embodiment, the computer device 300 may be configured to implement a user device such as a user device 102 discussed in connection with FIG. 1 and/or components or aspects of the device identification system such as described in connection with FIGS. 1 and 2. In some embodiments, computing device 300 may include many more components than those shown in FIG. 3. However, it is not necessary that all of these components be shown in order to disclose an illustrative embodiment.

As shown in FIG. 3, computing device 300 includes a network interface 302 for connecting to a network such as discussed above. In various embodiments, the computing device 300 may include one or more network interfaces 302 for communicating with one or more types of networks such as the Internet, wireless networks, cellular networks, and any other network.

In an embodiment, computing device 300 also includes one or more processing units 304, a memory 306, and an optional display 308, all interconnected along with the network interface 302 via a bus 310. The processing unit(s) 304 may be capable of executing one or more methods or routines stored in the memory 306. The display 308 may be configured to provide a graphical user interface to a user operating the computing device 300 for receiving user input, displaying output, and/or executing applications. In some cases, such as when the computing device 300 is a server, the display 308 may be optional.

The memory 306 may generally comprise a random access memory ("RAM"), a read only memory ("ROM"), and/or a permanent mass storage device, such as a disk drive. The memory 306 may store program code for an operating system 312, one or more device identification routines 314, and other routines. In various embodiments, the program code may be stored on a computer-readable storage medium, for example, in the form of a computer program comprising a plurality of instructions executable by one or more processors. The computer-readable storage medium may be non-transitory. The one or more device identification routines 314, when executed, may provide various functionalities associated with the device identification system as described herein.

In some embodiments, the software components discussed above may be loaded into memory 306 using a drive mechanism associated with a non-transient computer readable storage medium 318, such as a floppy disc, tape, DVD/CD-ROM drive, memory card, USB flash drive, solid state drive (SSD) or the like. In other embodiments, the software components may alternatively be loaded via the network interface 302, rather than via a non-transient computer readable storage medium 318. In an embodiment, the computing device 300 also include an optional time keeping device (not shown) for keeping track of the timing of transactions or network events.

In some embodiments, the computing device 300 also communicates via bus 310 with one or more local or remote databases or data stores such as an online data storage system via the bus 310 or the network interface 302. The bus 310 may comprise a storage area network ("SAN"), a high-speed serial bus, and/or via other suitable communication technology. In some embodiments, such databases or data stores may be integrated as part of the computing device 300.

Figure 4:
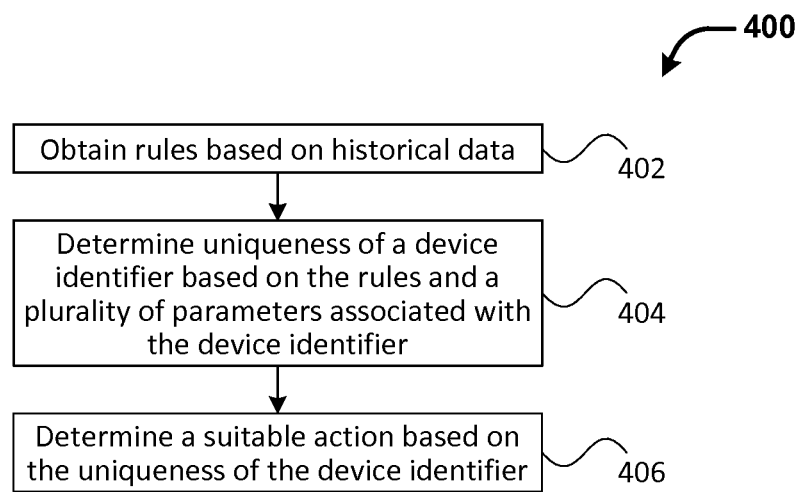
FIG. 4 illustrates an example process for implementing the present invention, in accordance with an embodiment.

FIG. 4 illustrates an example process 400 for implementing the present invention, in accordance with an embodiment. Aspects of the process 400 may be performed, for example, by a device identification system such as discussed in connection with FIGS. 1 and 2 or one or more computing devices such as discussed in connection with FIG. 3. Some or all aspects of the process 400 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

In an embodiment, the process 400 includes obtaining 402 a set of rules based on historical data. In various embodiments, the rules may include the evaluation rules, discussed herein, that may be used to determine the uniqueness of a device identifier. For example, the rules may include one or more parameter maps that map parameter values (original or derived) to weight values. The rules may further include formulas, algorithms, and the like for using the maps to (e.g., combining the weight values) to derive a device quality score and/or device quality grade. Such a device quality score or grade may be indicative of the uniqueness of the device identifier. In a typical embodiment, the size of the rules is a fraction of the amount of the historical data based on which the rules are derived.

As discussed above, historical data may include any data related to past data transactions, user activities, usage of computing and network resources and the like. In some cases, the historical data may include information indicative of reliability, trustworthiness or uniqueness of user devices or device identifiers. In some embodiments, the historical data may be obtained from a third-party data or service provider and/or accumulated by a provider of the device identification system. For example, historical data may include interactions with content providers, ecommerce or online retail service providers, banking, credit card, or financial service providers, airlines, travel service providers, and the like.

In some embodiments, the rules may be generated using a variety of machine learning and/or data mining techniques such as statistical analysis, neural networks, and the like. In one embodiment, some of the rules may be defined or specified by humans. In some embodiments, some of the rules may be generated from scratch or provided by a third-party provider.

In an embodiment, the process 400 includes determining 404 the uniqueness of a device identifier based on the rules discussed above and a plurality of parameters associated with the device identifier. In some embodiments, a device identifier may be used to identify the source or origin or a transaction, request, or network event. In some embodiments, a device identifier may be determined and/or derived based on any one or combination of one or more parameters such as described herein. For example, the device identifier may be based on one or more hardware and/or software settings or attributes of a device. For example, a device identifier may include or be based on an IP address associated with an HTTP request. As another example, a device identifier may include or be based on a username associated with an online account and a user agent identifier. The device identifier may include a device fingerprint without regard to user information. In one embodiment, the device identifier may be independent from the parameters described herein. In a typical embodiment, a device identifier is obtained or derived without the awareness of the originator of the transaction or network event identified by the device identifier. In other embodiments, the device identifier may be obtained with user awareness.

In various embodiments, a plurality of parameters such as those discussed herein may be obtained in connection with the device identifier. Such parameters may be obtained from the transaction or network event identified by the device identifier. Such parameters may be obtained, for example, by analyzing the metadata and/or data associated with a request, parsing a network log file, utilizing any suitable web analytics tools, and the like. In a typical embodiment, such parameters are obtained without user awareness. In some embodiments, such parameters may be collected with user awareness. In some embodiments, the device identifier and/ or parameters may be obtained without downloading anything to the device (i.e., using a tag-free technique) or by downloading something (e.g., a cookie or browser script) to the device.

Based on the rules and the plurality of parameters, uniqueness of the device identifier may be determined. In some embodiments, the uniqueness of the device identifier may be represented by a device quality score or grade discussed herein. In other embodiments, the uniqueness of the device identifier may be represented by any other suitable representations. More details for determining the uniqueness of a device identifier are discussed below in connection with FIGS. 5-7.

In an embodiment, the process 400 includes determining 406 a suitable action or measure to take based on the uniqueness of the device identifier. Such action may be selected among a plurality of actions based on a determined device quality score or quality grade for the device identifier. For example, different action(s) may be taken if the device identifier is more unique than if the device identifier is less unique, or if the quality score or grade is different. The action may include an active action such as the retrieval, storage, processing, modification, transmission, or the like, of one or more responses, messages, instructions, and the like. In an embodiment, the action may include not doing something. In some embodiments, determining the suitable action may include comparing the device quality score or grade with a predefined threshold value and selecting the suitable action based on the result of the comparison. For example, if a device identifier is determined to be more likely to be unique (e.g., having a quality score or grade higher than a predefined threshold value), then a more targeted advertisement may be provided. Conversely, if a device identifier is determined to be less likely to be unique (e.g., having a quality score or grade equal or less than the predefined threshold value), then a less targeted advertisement may be provided. Similarly, a more severe or drastic security or anti-fraud measure (e.g., adding the device identifier to a blacklist) may be taken if a device identifier is determined to be more likely to be unique. On the other hand, a more moderate security measure may be taken if a device identifier is determined to be less likely to be unique.

In some embodiments, step 402 may be performed on a periodic basis (e.g., daily, weekly, monthly). In some embodiments, steps 404 and 406 may be performed for each of a plurality of transactions in real or nearly real time or in an asynchronous fashion (i.e., not in real or nearly real time).

Figure 5:
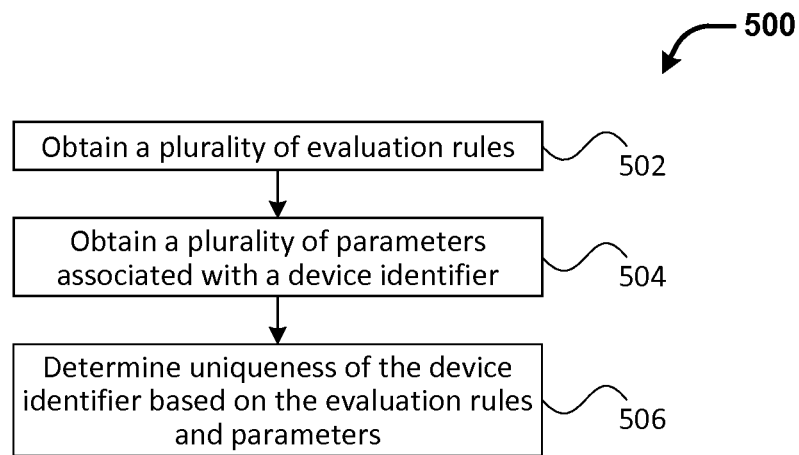
FIG. 5 illustrates an example process for determining the uniqueness of a device identifier, in accordance with an embodiment.

FIG. 5 illustrates an example process 500 for determining the uniqueness of a device identifier, in accordance with an embodiment. Aspects of the process 500 may be performed, for example, by the evaluation engine discussed in connection with FIG. 2a or 2b.

In an embodiment, the process 500 includes obtaining 502 a set of evaluation rules based on historical data. As discussed above, such rules may be made available via a data file, data storage system, web service, or any other suitable interface. In various embodiments, the rules may be made available via the push or pull technologies or a combination of both. In some embodiments, once the set of rules are obtained, they can be used to evaluate the uniqueness of one or more (e.g., hundreds or thousands of) device identifiers. In some embodiments, the rules may be updated occasionally (e.g., on a periodic basis).

In an embodiment, the process 500 includes obtaining 404 a plurality of parameters associated with a device identifier. The device identifier may be associated with a device, a group of devices, a transaction, a user, an organization or any other entity. The plurality of parameters may be obtained from the device identifier itself, from the entity associated with the device identifier, from log files, from real-time analysis of network traffic, or from other channels using any suitable method.

Based on the rules and the plurality of parameters, the uniqueness of the device identifier may be determined 506, for example, using the process discussed below in connection with FIGS. 6-7.

Figure 6:
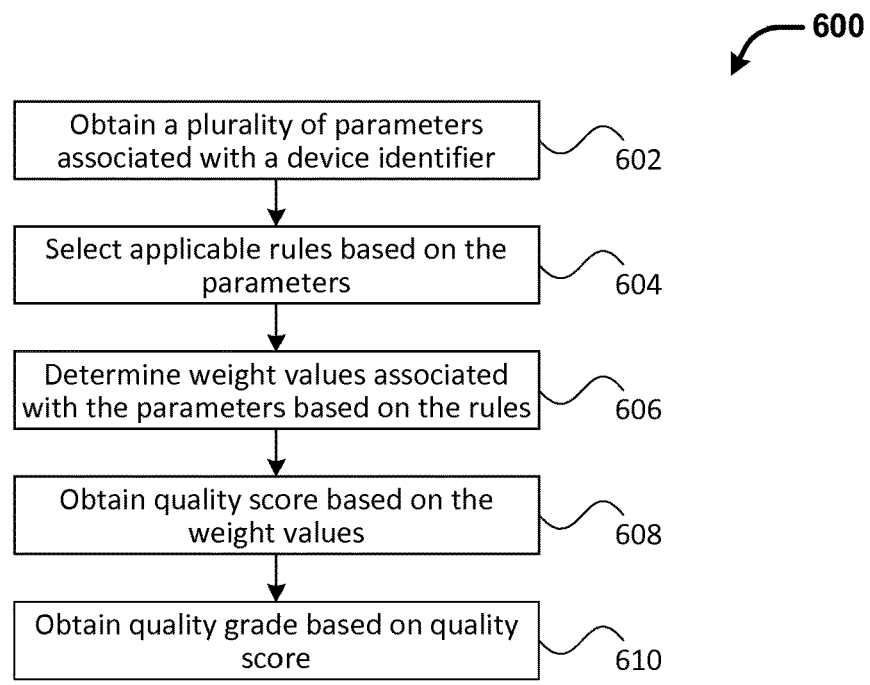
FIG. 6 illustrates an example process for determining the uniqueness of a device identifier, in accordance with an embodiment.

FIG. 6 illustrates an example process 600 for determining the uniqueness of a device identifier, in accordance with an embodiment. Aspects of the process 600 may be performed, for example, by the evaluation engine discussed in connection with FIG. 2a or 2b.

In an embodiment, the process 600 includes obtaining 602 a plurality of parameters associated with a device identifier. In some embodiments, step 602 may be similar to step 504 discussed in connection with process 500 of FIG. 5.

In an embodiment, the process 600 includes selecting 604 applicable rules based on the plurality of parameters. The selection may be based on one, two or more of the plurality of parameters obtained above. For example, different sets of rules may be applicable to different sets of parameters. As another example, the applicable set of rules may be dictated by a subset of the plurality of parameters such as whether the device identifier is associated with a desktop or a mobile device, the operating system or processor architecture associated with the device identifier and the like.

In an embodiment, the process 600 includes applying the selected rules to determine 606 a plurality of weight values respectively associated with at least some of the plurality of parameters. For example, for each parameter value associated with a given parameter, a value-weight map may be used to look up a corresponding weight value. The value-weight map may be stored as a lookup table or similar data structure in memory or in another data storage medium. The value-weight map(s) may or may not be part of the rules obtained in step 604. The weight values may be used to obtain 608 a device quality score. In some embodiments, weight values may be further weighted before being combined to derive the device quality score. For example, the device quality score may include a linear combination of the weighted weight values. The formula or algorithm for combining the weight values may or may not be part of the rules obtained in step 604. The quality score may be represented by numeric value. The numeric value may fall within a predetermined numerical range. In general, a higher quality score indicates a higher likelihood that a device identifier is unique and vice versa.

In some embodiments, the quality score may be used to derive 610 a quality grade, such as grade A, B, C and so on. For example, a quality score between 80 and 100 may be categorized as quality grade A, a quality score between 60 and 80 may be categorized as quality grade B, and so on. The quality grade may be represented by numeric or non-numeric values. In some embodiments, the step 610 of deriving a quality grade may be optional.

Figure 7:
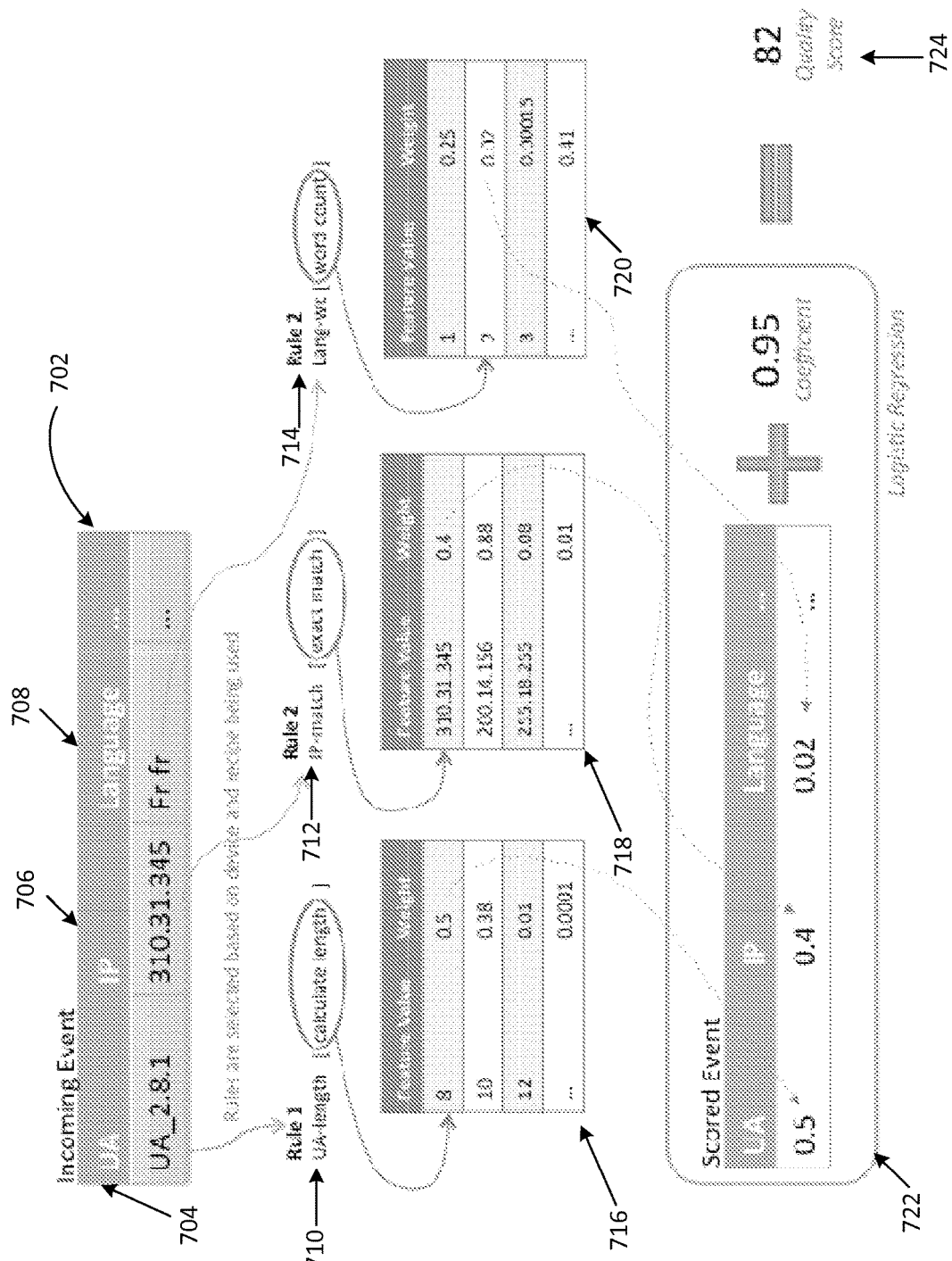
FIG. 7 illustrates an example process for calculating a device quality score, in accordance with an embodiment.

FIG. 7 illustrates an example process 700 for calculating a device quality score, in accordance with an embodiment. The process 700 may be similar to the process 600 described above in connection with FIG. 6.

The illustrated process may be used to calculate the quality score associated with a transaction or network event 702 that is identified by a device identifier (not shown). A plurality of parameters may be associated with the network event, such as user agent identifier 704, IP address 706, language code 708, and the like. For each of the plurality of parameters, a weight value may be obtained based on a corresponding value-weight map. For example, the value-weight maps 716, 718, 720 may correspond respectively to the parameters 704, 706 and 708. In some embodiments, the parameter values may be transformed or otherwise used to obtain the parameter value used to look up the value-weight map, for example, according to parameter-specific usage rules 710, 712 and 714. For example, the length of the character string of a user agent identifier is to be calculated and used as the parameter value to look up the user agent value-weight map 716, according to rule 710. For example, a user agent identifier "UA_2.8.1" has a character length of 8 and a weight value of 0.5 according to the user agent value-weight map 716. For IP addresses, no transformation may be necessary and the original IP address may be used to look up the IP address value-weight map 618, according to rule 712. For example, an IP address "310.31.345" has an exact match in the IP address value-weight map 718 with a weight value of 0.4. And for language codes, the number of word count may be used to look up the language value-weight map 720, according to rule 714. For example, a language "Fr-fr" has a word count of 2 and a weight value of 0.02 according to the language value-weight map 720.

Once the weight values are obtained, they may be combined to derive the device quality score, for example, according to a formula and/or algorithm 722 to derive the final quality score 724. As discussed above, the weight values may be further weighted (e.g., according to the relative significance of the parameters) before they are combined. In some embodiments, the quality score may be normalized, for example, using a coefficient. Any suitable methods of normalization may be used to normalize the quality score.

In various embodiments, the usage rules, value-weight maps, formula or algorithm discussed above may collectively comprise the evaluation rules discussed herein. Such evaluation rules may be derived once based on historical data and used repeatedly to quickly calculate quality scores for many device identifiers. The evaluation rules may be updated, for example, on a periodic basis, as the historical data evolves.

Figure 8:
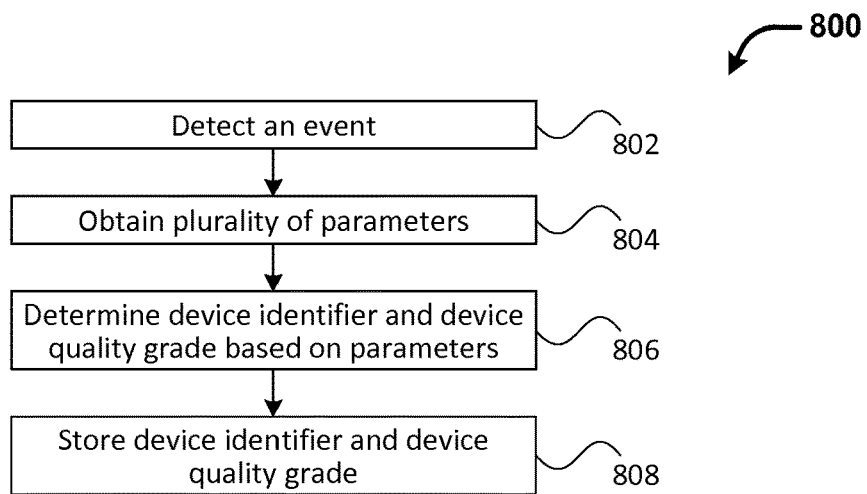
FIG. 8 illustrates an example process for determining the uniqueness of a device identifier, in accordance with an embodiment.

FIG. 8 illustrates an example process 800 for determining the uniqueness of a device identifier, in accordance with an embodiment. Aspects of the process 800 may be performed, for example, by the device identification system discussed in connection with FIG. 2*a* or 2*b*.

In an embodiment, process 800 includes detecting 802 a network event such as a browser event (e.g., clicking of a control, scrolling, resizing, loading or closing of a web page, and the like). Such detection may be implemented by a browser script (e.g., JavaScript).

In an embodiment, in response to the detected network event, a plurality of parameters related to the device associated with the network event is obtained 804. Based on some or all of the obtained plurality of parameters, a device identifier and a device quality grade may be determined 806. Such determination may be further based on pre-calculated rules derived from historical data. The rules may be embodied by the value-weight map/lookup table discussed herein. Finally, the device identifier and the device quality grade may be stored 808, such as in a data store 220 discussed in connection with FIG. 2*b*. In some embodiments, storage 808 step may be optional and the device identifier and device quality grade may be used directly without being stored first.

In some embodiments, the present invention separates the calculation of rules based on historical data from the use of the rules to derive device identifier and/or device quality score or grade associated with the device identifier. Such separation serves to limit the access to the historical data alleviating concerns with respect to the privacy of the historical data. The separation also allows fast, real-time or nearly real time, and scalable determination of device identifiers and/or device quality scores and/or grades. Additionally, in some embodiments, the rules may be stored at a central location, making it easy to maintain and update the rules independently from the uses of the rules.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method comprising:
establishing an electronic connection with one or more databases storing at least:
evaluation rules; and
a predetermined threshold associated with a range of quality scores;
detecting a network event during an online session between a computer system and a user device;
determining a device identifier associated with the user device based at least in part on parameters associated with the user device;
selecting a subset of the evaluation rules from the one or more databases, wherein the subset of the evaluation rules is selected based at least in part on a value of a given parameter of the parameters;

calculating a quality score associated with the device identifier, wherein the quality score is based at least in part on the subset of the evaluation rules and values of the parameters;

determining that the device identifier is not shared between multiple devices based on a comparison between the quality score and the predetermined threshold;

receiving an electronic indication that the online session is likely fraudulent;

based at least in part on the determination that the device identifier is not shared between multiple devices and the online session is likely fraudulent, adding the first device identifier to a blacklist such that network traffic from any devices with an association to the first device identifier are blocked.

2. The computer-implemented method of claim 1 further comprising:

determining that the device identifier is shared between multiple devices based on a comparison between the quality score and the predetermined threshold;

based at least in part on the determination that that the device identifier is shared between multiple devices, continue monitoring network traffic from the devices associated with the first device identifier.

3. The computer-implemented method of claim 1, wherein the evaluation rules are generated using a machine learning technique, wherein the machine learning technique comprises a neutral network or a statistical analysis of historical data comprising device fingerprints and indication of whether such fingerprints uniquely identify a device.

4. The computer-implemented method of claim 3, wherein the quality score is not based on the historical data.

5. The computer-implemented method of claim 1, wherein:

the parameters are associated with weight values;
the weight values comprise:
a first weight value associated with a first parameter of the parameters and is determined based at least in part on a first weight-value map and a value of the first parameter; and
a second weight value associated with a second parameter of the parameters and is determined based at least in part on a second weight-value map and a value of the second parameter.

6. The computer-implemented method of claim 1, wherein:

the subset of the evaluation rules comprises a first evaluation rule and a second evaluation rule;
the first evaluation rule is associated with the first parameter and the first weight-value map; and
the second evaluation rule is associated with the second parameter and the second weight-value map.

7. The computer-implemented method of claim 1 further comprising:

based at least in part on the determination that the quality score satisfies the predetermined threshold, transmitting a targeted content to the user device, wherein the targeted content is customized based at least in part on the device data associated with the first user device; and
based at least in part on the determination that the quality score does not satisfy the predetermined threshold, not transmitting a targeted content to the user device.

8. A non-transitory computer storage having stored thereon a computer program, the computer program including executable instructions that instruct a computer system to at least:

establish an electronic connection with one or more databases storing at least:
evaluation rules; and
a predetermined threshold associated with a range of quality scores;
detect a network event during an online session between a computer system and a user device;
determine a device identifier associated with the user device based at least in part on parameters associated with the user device;
selecting a subset of the evaluation rules from the one or more databases, wherein the subset of the evaluation rules is selected based at least in part on a value of a given parameter of the parameters;
calculate a quality score associated with the device identifier, wherein the quality score is based at least in part on the subset of the evaluation rules and values of the parameters;
determine that the device identifier is not shared between multiple devices based on a comparison between the quality score and the predetermined threshold;
receive an electronic indication that the online session is likely fraudulent;
based at least in part on the determination that the device identifier is not shared between multiple devices and the online session is likely fraudulent, add the first device identifier to a blacklist such that network traffic from any devices with an association to the first device identifier are blocked.

9. The non-transitory computer storage of claim 8, wherein the executable instructions further instruct the computer system to:

determine that the device identifier is shared between multiple devices based on a comparison between the quality score and the predetermined threshold;
based at least in part on the determination that that the device identifier is shared between multiple devices, continue to monitor network traffic from the devices associated with the first device identifier.

10. The non-transitory computer storage of claim 8, wherein the evaluation rules are generated using a machine learning technique, wherein the machine learning technique comprises a neutral network or a statistical analysis of historical data comprising device fingerprints and indication of whether such fingerprints uniquely identify a device.

11. The non-transitory computer storage of claim 10, wherein the quality score is not based on the historical data.

12. The non-transitory computer storage of claim 8, wherein:

the parameters are associated with weight values;
the weight values comprise:
a first weight value associated with a first parameter of the parameters and is determined based at least in part on a first weight-value map and a value of the first parameter; and
a second weight value associated with a second parameter of the parameters and is determined based at least in part on a second weight-value map and a value of the second parameter.

13. The non-transitory computer storage of claim 8, wherein:

the subset of the evaluation rules comprises a first evaluation rule and a second evaluation rule;
the first evaluation rule is associated with the first parameter and the first weight-value map; and
the second evaluation rule is associated with the second parameter and the second weight-value map.

14. The non-transitory computer storage of claim 8, wherein the executable instructions further instruct the computer system to:
- based at least in part on the determination that the quality score satisfies the predetermined threshold, transmit a targeted content to the user device, wherein the targeted content is customized based at least in part on the device data associated with the first user device; and
- based at least in part on the determination that the quality score does not satisfy the predetermined threshold, not transmit a targeted content to the user device.

15. A computer system for automatically selecting an electronic security action based on a uniqueness assessment of a device identifier, the system comprising:
- one or more processors; and
- a memory, including instructions executable by the one or more processors to cause the computer system to at least:
  - establish an electronic connection with one or more databases storing at least:
    - evaluation rules; and
    - a predetermined threshold associated with a range of quality scores;
  - detect a network event during an online session between a computer system and a user device;
  - determine a device identifier associated with the user device based at least in part on parameters associated with the user device;
  - selecting a subset of the evaluation rules from the one or more databases, wherein the subset of evaluation rules is selected based at least in part on a value of a given parameter of the parameters;
  - calculate a quality score associated with the device identifier, wherein the quality score is based at least in part on the subset of the evaluation rules and values of the parameters;
  - determine that the device identifier is not shared between multiple devices based on a comparison between the quality score and the predetermined threshold;
  - receive an electronic indication that the online session is likely fraudulent;
  - based at least in part on the determination that the device identifier is not shared between multiple devices and the online session is likely fraudulent, add the first device identifier to a blacklist such that network traffic from any devices with an association to the first device identifier are blocked.

16. The system of claim 15, wherein the executable instructions further instruct the computer system to:
- determine that the device identifier is shared between multiple devices based on a comparison between the quality score and the predetermined threshold;
- based at least in part on the determination that that the device identifier is shared between multiple devices, continue to monitor network traffic from the devices associated with the first device identifier.

17. The system of claim 15, wherein the evaluation rules are generated using a machine learning technique, wherein the machine learning technique comprises a neutral network or a statistical analysis of historical data comprising device fingerprints and indication of whether such fingerprints uniquely identify a device.

18. The system of claim 15, wherein:
the parameters are associated with weight values;
the weight values comprise:
- a first weight value associated with a first parameter of the parameters and is determined based at least in part on a first weight-value map and a value of the first parameter; and
- a second weight value associated with a second parameter of the parameters and is determined based at least in part on a second weight-value map and a value of the second parameter.

19. The system of claim 15, wherein:
the subset of the evaluation rules comprises a first evaluation rule and a second evaluation rule;
the first evaluation rule is associated with the first parameter and the first weight-value map; and
the second evaluation rule is associated with the second parameter and the second weight-value map.

20. The system of claim 15, wherein the executable instructions further instruct the computer system to:
- based at least in part on the determination that the quality score satisfies the predetermined threshold, transmit a targeted content to the user device, wherein the targeted content is customized based at least in part on the device data associated with the first user device; and
- based at least in part on the determination that the quality score does not satisfy the predetermined threshold, not transmit a targeted content to the user device.

* * * * *

UNITED STATES PATENT AND TRADEMARK OFFICE
CERTIFICATE OF CORRECTION

PATENT NO. : 11,657,299 B1
APPLICATION NO. : 17/089577
DATED : May 23, 2023
INVENTOR(S) : Raz Yalov It is certified that error appears in the above-identified patent and that said Letters Patent is hereby corrected as shown below:

In the Specification

In Column 4, Line 21, delete "(ROlndex)" and insert --(ROIndex)--.

In the Claims

In Column 17, Claim 2, Line 22, delete "that that" and insert --that--.

In Column 18, Claim 9, Line 36, delete "that that" and insert --that--.

In Column 20, Claim 16, Line 8, delete "that that" and insert --that--.

Signed and Sealed this
Seventeenth Day of October, 2023

Katherine Kelly Vidal
*Director of the United States Patent and Trademark Office*